United States Patent
Muric et al.

(10) Patent No.: US 10,428,677 B2
(45) Date of Patent: Oct. 1, 2019

(54) METHOD FOR MODELING A COMPRESSOR SPEED

(71) Applicant: VOLVO TRUCK CORPORATION, Göteborg (SE)

(72) Inventors: Kenan Muric, Eslöv (SE); Henrik Wassen, Pixbo (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 15/561,035

(22) PCT Filed: May 6, 2015

(86) PCT No.: PCT/EP2015/059909
§ 371 (c)(1),
(2) Date: Sep. 23, 2017

(87) PCT Pub. No.: WO2016/177413
PCT Pub. Date: Nov. 10, 2016

(65) Prior Publication Data
US 2018/0073385 A1    Mar. 15, 2018

(51) Int. Cl.
*F01D 17/06*        (2006.01)
*G05B 17/02*       (2006.01)
(Continued)

(52) U.S. Cl.
CPC .............. *F01D 17/06* (2013.01); *F02B 37/18* (2013.01); *F02B 39/16* (2013.01); *G05B 17/02* (2013.01);
(Continued)

(58) Field of Classification Search
CPC ........ F01D 17/16; F01D 17/08; F01D 17/085; F05D 2270/708; F02D 23/00;
(Continued)

(56) References Cited

U.S. PATENT DOCUMENTS

| 2,493,784 A | 1/1950 | Strader |
| 6,644,029 B2 | 11/2003 | Weinreuter |

(Continued)

FOREIGN PATENT DOCUMENTS

| DE | 102004019315 A1 | 11/2005 |
| JP | 2001304387 A | 10/2001 |

(Continued)

OTHER PUBLICATIONS

International Search Report (dated Apr. 20, 2016) for corresponding International App. PCT/EP2015/059909.

(Continued)

*Primary Examiner* — Lindsay M Low
*Assistant Examiner* — George C Jin
(74) *Attorney, Agent, or Firm* — Venable LLP; Jeffri A. Kaminski (57) ABSTRACT

A method is provided for modeling the compressor speed of a turbocharger, and includes determining the temperature difference across the compressor, determining the mass flow through the compressor, and calculating a compressor speed value as a function of the temperature difference across the compressor and the mass flow.

10 Claims, 5 Drawing Sheets

(51) Int. Cl.
  *F02B 37/18*   (2006.01)
  *F02B 39/16*   (2006.01)
(52) U.S. Cl.
  CPC .... *F02B 2039/168* (2013.01); *F05D 2220/40* (2013.01); *F05D 2270/708* (2013.01); *Y02T 10/144* (2013.01)
(58) Field of Classification Search
  CPC .... F02D 23/005; F02D 28/00; F02D 41/0007; F02D 41/18; F02B 39/16; F02B 37/00; F02B 37/18; F02B 37/12; F02B 2039/168; G01M 15/14; G05B 17/02
  See application file for complete search history.

(56) References Cited

U.S. PATENT DOCUMENTS

| | | | |
|---|---|---|---|
| 8,459,038 B1 | 6/2013 | Lickfold et al. | |
| 8,892,332 B2* | 11/2014 | Chi | F02D 28/00 701/102 |
| 2009/0055072 A1* | 2/2009 | He | F02D 41/0007 701/102 |
| 2009/0314082 A1* | 12/2009 | Sujan | F01D 17/06 73/497 |
| 2013/0074492 A1 | 3/2013 | Chi et al. | |
| 2015/0143882 A1 | 5/2015 | Nakano et al. | |

FOREIGN PATENT DOCUMENTS

| | | |
|---|---|---|
| WO | 2013031919 A1 | 3/2013 |
| WO | 2014002464 A1 | 6/2013 |
| WO | 2013175588 A1 | 11/2013 |
| WO | 2014207810 A1 | 2/2017 |

OTHER PUBLICATIONS

Japanese Official Action (dated Jan. 29, 2019) for corresponoing Japanese App. 2017-557454.

* cited by examiner

METHOD FOR MODELING A COMPRESSOR SPEED

BACKGROUND AND SUMMARY

The invention relates to a method for modeling the speed of a compressor, in particular for a turbocharger.

The invention can be applied in heavy-duty vehicles, such as trucks, buses and construction equipment. Although the invention will be described with respect to a truck, the invention is not restricted to this particular vehicle, but may also be used in other applications utilizing turbocharger units such as aero or marine systems.

A turbocharger is a vehicle component used together with an associated internal combustion engine, typically a diesel engine. The turbocharger is configured to recover a part of the energy of the exhaust gas and to use that energy to compress intake air flowing into the combustion chamber of the internal combustion engine. Turbochargers are commonly provided for increasing the efficiency and power of the internal combustion engine.

A turbocharger has three main components; a turbine for converting energy of the exhaust gas flow to a rotational movement of the turbine, a compressor rotationally connected to the turbine for compressing intake air, and a housing enclosing the turbine and the compressor as well as a rotating shaft, bearings, etc.

In order to monitor the wear of the rotating parts of the turbocharger it is desirable to determine the speed of the turbine or the compressor. In particular, wear of the compressor is typically categorized by low cycle fatigue and high cycle fatigue. Low cycle fatigue corresponds to relatively small fluctuations in compressor speed, while high cycle fatigue corresponds to relatively rapid (and large) changes in compressor speed. Fatigue will eventually lead to substantial changes in the material structure of the compressor, which may lead to a sudden breakage of the compressor. Such breakage will in most cases lead to a malfunction of the entire turbocharger, requiring standstill of the vehicle and costly service and/or replacement of the turbocharger.

Different solutions for monitoring the compressor speed have been proposed. In particular, it has been suggested to arrange a physical speed sensor at the compressor. However, more recent solutions have been suggested in which the physical sensor is replaced by a compressor speed model for estimating the compressor speed.

One solution for modeling the speed of a double-stage turbocharger is described in US2009/0314082. Here, the speed of each turbine is modeled separately and the temperature as well as the pressure between the turbines is used as input for the speed estimation, as well as an ambient pressure value. While US2009/0314082 requires a number of physical sensors for providing the necessary input data, it would be advantageous to provide a speed modeling method reducing this number of required sensors.

It is desirable to provide a method for modeling the compressor speed overcoming the above mentioned drawbacks of prior art methods.

By determining the temperature difference across the compressor, and use this temperature difference as input for the compressor speed model, it is no longer necessary to have an ambient pressure sensor providing input data for the model.

A method for modeling the compressor speed of a turbocharger is therefore provided, comprising i) determining the temperature difference across the compressor, ii) determining the mass flow through the compressor, and iii) calculating a compressor speed value as a function of the temperature difference across the compressor and the mass flow.

In an embodiment, the step of calculating the compressor speed value is performed using $$N_{turbo} \propto \frac{dm_{gas}}{dt} \tilde{R}(T_{boost} - T_{in}),$$

where $N_{turbo}$ is the compressor speed, $$\frac{dm_{gas}}{dt}$$

is the mass flow, $\tilde{R}$ is a corrected ideal gas constant, and $T_{boost}-T_{in}$ is the temperature difference across the compressor. This thermodynamic approach does not require the pressure ratio across the compressor, thus leading to significant reduction in hardware complexity of the associated turbocharger.

In an embodiment, $$N_{turbo} \propto \frac{dm_{gas}}{dt} \tilde{R}(T_{boost} - T_{in})$$

is calculated using $$N_{turbo} = F\left(\frac{dm_{gas}}{dt}, T_{boost} - T_{in}\right).$$

Reducing the relationship in this manner greatly facilitates the necessary computing for modeling the compressor speed.

In an embodiment the step of calculating the compressor speed value is performed by a polynomial representation of $$N_{turbo} = F\left(\frac{dm_{gas}}{dt}, T_{boost} - T_{in}\right)$$

according to:

$$F\left(\frac{dm_{gas}}{dt}, T_{boost} - T_{in}\right) = F(x, y) = a_1 x^2 + a_2 xy + a_3 y^2 + a_4 x + a_5 y + a_6.$$

This has proven to provide a good fit for the relationship.

In an embodiment, the method further comprises the step of determining if a recovered exhaust gas flow is introduced downstream the compressor. Further the step of determining the mass flow is performed by determining the mass flow of the gas exiting the compressor and correcting the determined mass flow by a factor corresponding to recovered exhaust gas flow. By introducing the effects caused by recovered exhaust gas flow, the accuracy of the modeling method is improved.

In an embodiment the step of determining the temperature difference across the compressor is performed by estimating the temperature downstream the compressor, and by subtracting the estimated temperature from a measured ambient temperature. Since it is difficult to arrange a physical temperature sensor close to the compressor, an estimated temperature just downstream the compressor will provide a more accurate value for the resulting temperature difference.

In an embodiment the step of estimating the temperature downstream the compressor is performed by measuring the temperature in an air inlet manifold, and correcting this temperature by a factor corresponding to the temperature loss across an associated cooler. Hence, accuracy of the speed modeling method is further improved.

In an embodiment the method further comprises the step of determining the pressure ratio across the compressor. Further, the step of calculating the compressor speed value is performed by calculating the compressor speed value as a function of the pressure ratio. By including the pressure ratio across the compressor as input for the compressor speed modeling method, accuracy may be further improved.

In an embodiment the step of determining the pressure ratio across the compressor is performed by determining if the ambient pressure is below a preset ambient pressure corresponding to high altitude conditions, and if so, setting the ambient pressure as the preset ambient pressure, and dividing the boost pressure with the ambient pressure. In this embodiment, high altitude conditions are also considered. This is highly beneficial for increasing the accuracy of the speed modeling. As there is otherwise a risk of overestimating the compressor speed, this will avoid unnecessary torque derate at higher altitudes as well as wrong calculations for low cycle fatigue.

In an embodiment the step of calculating the compressor speed value is performed by estimating a compressor speed value using the pressure ratio as input, and calculating a corrected compressor speed value from the estimated compressor speed value and the actual ambient pressure. This has proven to provide an accurate model performance.

According to a second aspect, a method for modeling the compressor speed of a turbocharger is also provided. The method comprises i) determining the ambient pressure, ii) determining if the ambient pressure is below a preset ambient pressure corresponding to high altitude conditions, and if so, setting the ambient pressure as the preset ambient pressure, iii) determining a pressure ratio from the boost pressure and the ambient pressure, iv) estimating a compressor speed value using the pressure ratio as input, and v) calculating a corrected compressor speed value from the estimated compressor speed value and the actual ambient pressure. Similar to what has been discussed above, this is highly beneficial for increasing the accuracy of the speed modeling. As there is otherwise a risk of overestimating the compressor speed, this will avoid unnecessary torque derate at higher altitudes as well as wrong calculations for low cycle fatigue.

In an embodiment the method comprises the further steps of determining the temperature difference across the compressor, determining the mass flow through the compressor, and calculating a compressor speed value as a function of the pressure ratio, the temperature difference across the compressor, and the mass flow.

In an embodiment, the step of calculating the compressor speed value is performed by a polynomial representation of $$N_{turbo} = F\left(\frac{dm_{gas}}{dt}, T_{boost} - T_{in}, P_{ratio}\right) =$$

$$F(x, y, z) = a_1 x^2 + a_2 xy + a_3 y^2 + a_4 x + a_5 y + a_6 z^2 + a_7 z + a_8,$$

where $N_{turbo}$ is the compressor speed, $$\frac{dm_{gas}}{dt}$$

is the mass flow, $T_{boost}-T_{in}$ is the temperature difference across the compressor, and $P_{ratio}$ is the pressure ratio across the compressor.

In an embodiment, the method comprises the further step of determining if a recovered exhaust gas flow is introduced downstream the compressor, and wherein the step of determining the mass flow is performed by determining the mass flow of the gas exiting the compressor and correcting the determined mass flow by a factor corresponding to recovered exhaust gas flow.

In an embodiment the step of determining the temperature difference across the compressor is performed by estimating the temperature downstream the compressor, and by subtracting the estimated temperature from a measured ambient temperature.

In an embodiment the step of estimating the temperature downstream the compressor is performed by measuring the temperature in an air inlet manifold, and correcting this temperature by a factor corresponding to the temperature loss across an associated cooler.

A computer program is also provided, comprising program code means for performing the steps of any of the aspects above when said program is run on a computer.

A computer readable medium is also provided, carrying a computer program comprising program code means for performing the steps of any of the above mentioned aspects when said program product is run on a computer.

A controller for modeling the compressor speed of a turbocharger is also provided. The controller is configured to perform the steps of the method according to the first and second aspects described above.

A controller for modeling the compressor speed of a turbocharger is also provided. The controller comprises a processor and a memory, said memory containing instructions executable by the processor. The controller is operative to determining the temperature difference across the compressor, determining the mass flow through the compressor, and calculating a compressor speed value as a function of the temperature difference across the compressor and the mass flow.

In an embodiment the controller is further operative to perform the method according to the first or second aspects described above.

A controller for modeling the compressor speed of a turbocharger is also provided. The controller comprises a processor and a memory, said memory containing instructions executable by the processor. The controller is operative to determining the ambient pressure, determining if the ambient pressure is below a preset ambient pressure corresponding to high altitude conditions, and if so, setting the ambient pressure as the preset ambient pressure, determining a pressure ratio from the boost pressure and the ambient pressure, estimating a compressor speed value using the pressure ratio as input, and calculating a corrected compressor speed value from the estimated compressor speed value and the actual ambient pressure.

In an embodiment the controller is further operative to perform the method according to the second aspect described above.

A controller for modeling the compressor speed of a turbocharger is also provided. The controller comprises a first module configured to determining the temperature difference across the compressor, a second module configured to determining the mass flow through the compressor, and a third module configured to calculating a compressor speed value as a function of the temperature difference across the compressor and the mass flow.

In an embodiment the controller further comprises additional modules configured to perform the method according to the first aspect described above.

A controller for modeling the compressor speed of a turbocharger is also provided. The controller comprises a first module configured to determining the ambient pressure, a second module configured to determining if the ambient pressure is below a preset ambient pressure corresponding to high altitude conditions, and if so, setting the ambient pressure as the preset ambient pressure, a third module configured to determining a pressure ratio from the boost pressure and the ambient pressure, a fourth module configured to estimating a compressor speed value using the pressure ratio as input, and a fifth module configured to calculating a corrected compressor speed value from the estimated compressor speed value and the actual ambient pressure.

In an embodiment the controller further comprises additional modules configured to perform the method according to the second aspect described above.

A vehicle is also provided, comprising a controller according to the aspects described above.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
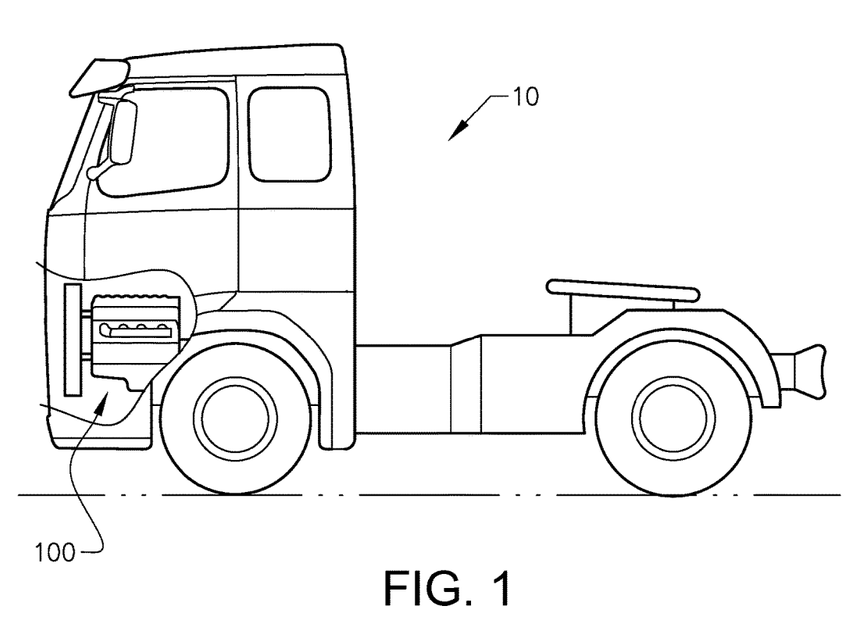
FIG. 1 is a side view of a vehicle according to an embodiment.

Starting with FIG. 1 a vehicle 10 is shown. The vehicle 10, which is illustrated as a truck, has an internal combustion engine 100 for driving the vehicle 10. As will be further explained below the internal combustion engine 100 of the vehicle 10 is provided with a turbocharger 130 and a controller 200. The vehicle 10 may have additional propulsion units, such as electric drives etc. as long as it has at least one engine providing a flow of exhaust gases interacting with the turbocharger unit 130. Hence the vehicle 10 is not exclusively a truck but may also represent various vehicles such as buses, constructional equipment, etc.

Figure 2:
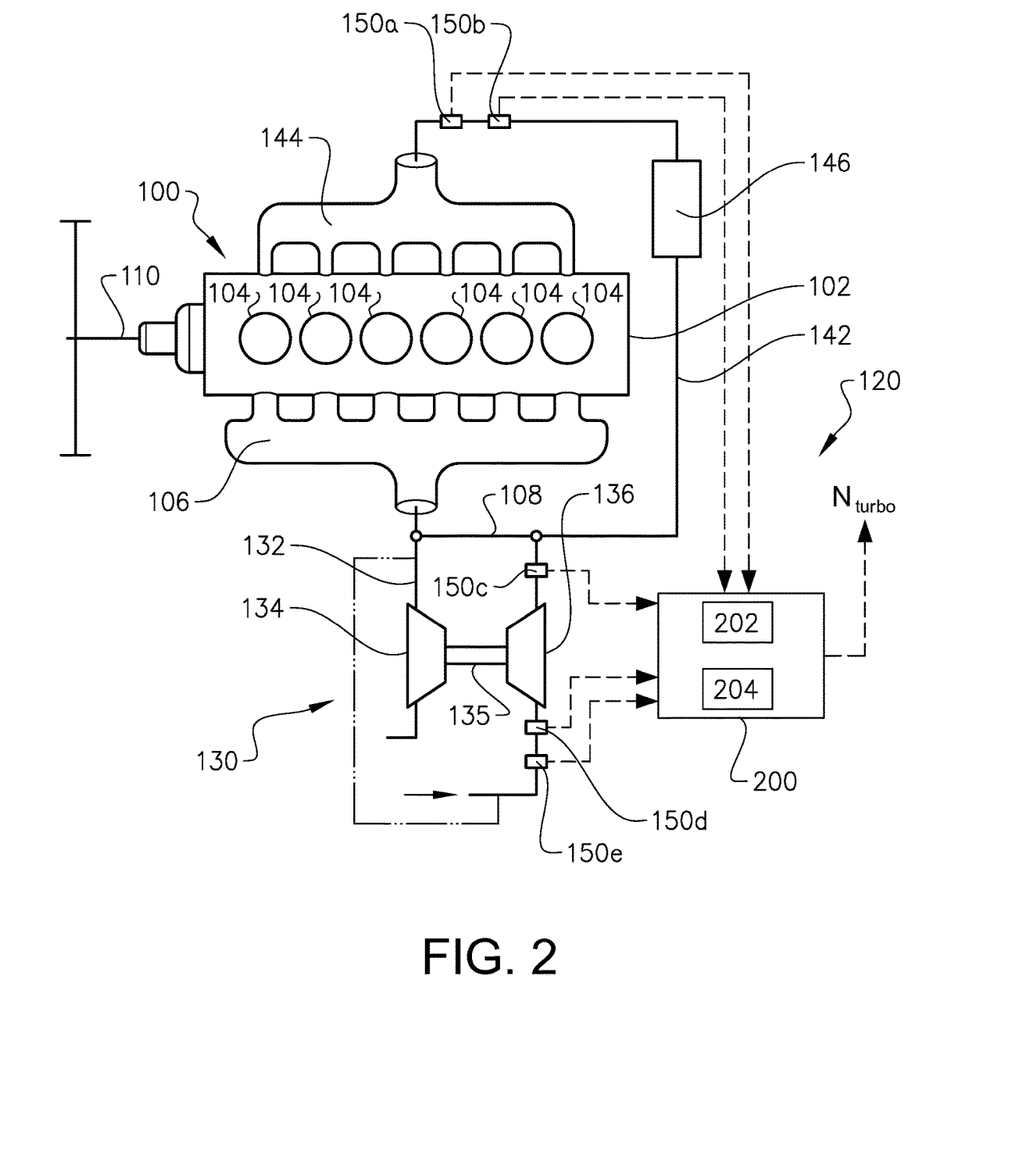
FIG. 2 is a schematic view of an internal combustion engine according to an embodiment.

In FIG. 2 an example of an internal combustion engine 100 is shown. The internal combustion engine 100 includes a cylinder block 102 being provided with a plurality of cylinders 104 operated to combust fuel, such as diesel or gasoline, whereby the motion of pistons reciprocating in the cylinders 104 is transmitted to a rotation movement of a crank shaft 156. The crank shaft 110 is further coupled to a transmission (not shown) for providing a torque to driving elements (not shown). In case of a heavy vehicle, such as a truck, the driving elements are wheels; however the internal combustion engine 100 may also be used for other equipment such as construction equipment, marine applications, etc.

The internal combustion engine 100 further comprises an exhaust gas system 120, which system 120 serves the purpose of recovering at least some of the energy in the exhaust gas flow to improve the performance of the internal combustion engine 100. In the shown example the exhaust gas exits the cylinders 104 and enters an exhaust manifold 106 which is further connected to an exhaust inlet 132 of a turbocharger unit 130. The exhaust gas flow causes a turbine 134 arranged inside a turbine housing to rotate, which rotation is translated via a shaft 135 to a corresponding rotation of a compressor 136 arranged inside a compressor housing and being used to compress incoming air before it is introduced in the cylinders 104.

Air is introduced to interact with the compressor 136 via an air inlet 140. Downstream the compressor 136, i.e. after the incoming air is compressed, it is guided by an air conduit 142 to an air inlet manifold 144 being connected with the cylinders 104. A cooler 146, such as a charged air cooler, may be provided in the air conduit 142.

Some of the exhaust gas flow may be re-circulated to the cylinders 104 via the air conduit 142 in order to provide exhaust gas recovery. For this a bypass line 108 may at one end be connected to the exhaust gas flow path at a position between the exhaust gas manifold 106 and the exhaust gas inlet 132 of the turbocharger 130. A second end of the bypass line 108 is connected to the air conduit 142 somewhere downstream the compressor 136.

A controller 200 is also provided for modeling the speed of the compressor 136. The controller 200 comprises a processor 202 and a memory 204, wherein the memory 204 contains instructions executable by the processor 202.

The memory 204 may be implemented by any known memory technology, including but not limited to E(E) PROM, S(D)RAM and flash memory, and it may also include secondary storage such as a magnetic or optical disc. Physically, the memory 204 may consist of or comprise one unit or a plurality of units which together constitute the memory 204 on a logical level. In some embodiments, it may be implemented at least partly by a storage area in another component of the controller 200. The processor 202 is overall responsible for the operation of the controller 200. The processor 202 may e.g. be implemented by means of a PLC, CPU, and/or DSP capable of performing the intended functionality.

The controller 200 is operative to receive a plurality of data inputs, and to model the compressor speed as a function of at least some of the data inputs. For this, a number of sensors 150a-e are provided and configured to measure various parameters of the air flowing into, and out from, the compressor 136. The sensors 150a-e are connected to the controller 200. In one embodiment, a temperature sensor 150a is arranged in the air inlet manifold 144 for providing data corresponding to the boost temperature $T_{boost}$. A pressure sensor 150b may be arranged in the air inlet manifold 144 for providing data corresponding to the boost pressure $p_{boost}$. A further sensor 150c may be arranged in the air conduit 142 immediately downstream the compressor 136 for providing data corresponding to the mass air flow $$\frac{dm_{gas}}{dt}.$$

Additional sensors 150d-e may be provided in the air conduit 142 upstream the compressor 136 for providing data corresponding to the ambient temperature $T_{in}$ and the ambient pressure $p_{amb}$.

Figure 3:
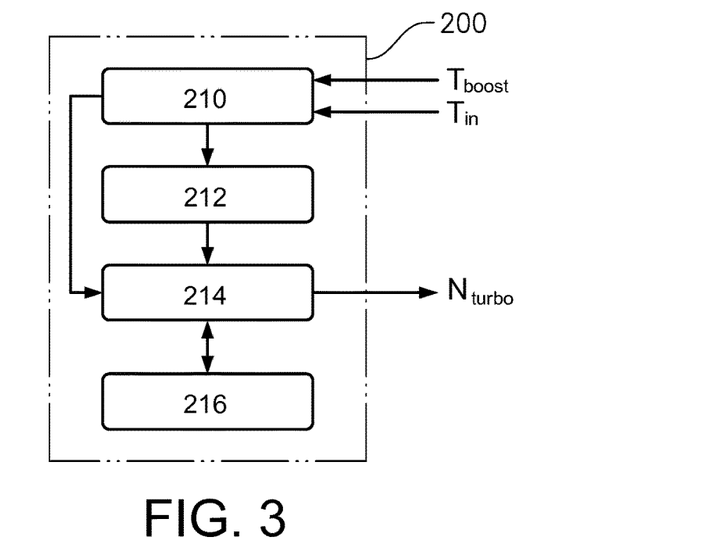
FIG. 3 is a schematic view of a controller according to an embodiment.

According to one specific aspect, the sensors 150a, 150d, and 150c are used for allowing the controller to determine the speed of the compressor 136. According to this particular aspect, as is shown in FIG. 3, the controller 200 includes a number of modules 210, 212, 214, 216. The modules 210, 212, 214, 216 may be implemented by hardware and/or software. A first module 210 is configured to determine the temperature difference across the compressor 136 from the boost temperature and the inlet, or ambient temperature. Hence, the controller 200 receives measured sensor data from the sensors 150a, 150d. The second module 212 is configured to determine the mass flow. Hence, the controller 200 receives measured sensor data from the sensor 150c. The third module 214 is configured to calculate the compressor speed $N_{turbo}$ from the determined temperature difference and the determined mass flow. A fourth module 216 is also provided and configured to communicate the modelled compressor speed to an associated unit for monitoring the current status of the turbocharger components, especially in terms of service and maintenance. The associated unit may either be arranged on-board the vehicle, or remote from the vehicle.

The third module 214 is preferably calculating the compressor speed value using a relationship in the form of $$N_{turbo} \propto \frac{dm_{gas}}{dt} \tilde{R}(T_{boost} - T_{in}),$$

where $N_{turbo}$ is the compressor speed, $$\frac{dm_{gas}}{dt}$$

is the mass flow, $\tilde{R}$ is a corrected ideal gas constant, and $T_{boost}-T_{in}$ is the temperature difference across the compressor. The relationship of $$N_{turbo} \propto \frac{dm_{gas}}{dt} \tilde{R}(T_{boost} - T_{in})$$

may preferably be calculated using $$N_{turbo} = F\left(\frac{dm_{gas}}{dt}, T_{boost} - T_{in}\right),$$

as will be further described below.

Calculating the compressor speed value may be performed by forming a polynomial representation of $$N_{turbo} = F\left(\frac{dm_{gas}}{dt}, T_{boost} - T_{in}\right)$$

according to $$F\left(\frac{dm_{gas}}{dt}, T_{boost} - T_{in}\right) = F(x, y) = a_1 x^2 + a_2 xy + a_3 y^2 + a_4 x + a_5 y + a_6.$$

In general, the following relationship between turbo power and gas property before and after the compressor is assumed to be valid:

$$\dot{W}_{supplied} \propto p_{boost}\frac{dV_{out}}{dt} - p_{amb}\frac{dV_{in}}{dt} = \frac{dm_{gas}}{dt}\tilde{R}(T_{boost} - T_{in})$$

As is evident, the mass flow relationship is much simpler than an equivalent volume velocity relationship. Hence, only the mass flow relationship is used in the modeling procedure as presented herein. The power supply needed to maintain a certain level of mass flow at a given temperature increase will also be proportional to the turbo speed, $N_{turbo}$ according to $\dot{W}_{supplied} \propto N_{turbo}$. Thus, $$N_{turbo} \propto p_{boost}\frac{dV_{out}}{dt} - p_{amb}\frac{dV_{in}}{dt} = \frac{dm_{gas}}{dt}\tilde{R}(T_{boost} - T_{in})$$

applies. The mass flow may either be measured, or calculated by applying the following equation:

$$\rho_{gas\ after\ compressor} = p_{boost}/(\tilde{R}_{gas}T_{boost})$$

The gas specific ideal gas law constant is calculated as $\tilde{R}_{gas} = R/M_{gas}$, while the molar mass of the gas is dependent on $\lambda$ and exhaust gas recovery fraction, $\beta$:

$$M_{gas} = M_{air}(1-\beta) + M_{EGR}\beta$$

$$M_{EGR} = \frac{1}{a + \frac{b}{2} + (\lambda - 1)\left(a + \frac{b}{4}\right) + 3.773\lambda\left(a + \frac{b}{4}\right)}$$
$$\left(aM_{CO_2} + \frac{b}{2}M_{H_2O} + (\lambda - 1)\left(a + \frac{b}{4}\right)M_{O_2} + 3.773\lambda\left(a + \frac{b}{4}\right)M_{N_2}\right).$$

The parameters, a and b, may be given by a fuel model structure. A common model of diesel which may be used is iso-octane, $C_8H_{18}$.

The ideal mass flow may thus be calculated, for a four-stroke diesel engine of size $V_{engine}$ and engine speed $N_{engine}$, as:

$$\frac{dm_{gas}}{dt} = \frac{1}{2}V_{engine}N_{engine}\rho_{gas\ after\ compressor}.$$

In a real application, the ideal mass flow above may not be a realistic quantity. For providing a better estimation, the volumetric efficiency could also be considered. A simple model of the volumetric efficiency is $$\mu_{vol} = f\left(N_{engine}, \frac{p_{exhaust}}{p_{boost}}\right).$$

For reasons of simplicity, a decomposition of the engine speed and pressure dependency may preferably be made according to ($c_r$: compression ratio):

$$\mu_{vol} = g(N_{engine}) h\left(\frac{p_{exhaust}}{p_{boost}}\right)$$

$$h\left(\frac{p_{exhaust}}{p_{boost}}\right) = \frac{c_r}{c_r - 1} - \left(\frac{p_{exhaust}}{p_{boost}}\right)^{\frac{1}{\gamma}} \frac{1}{c_r - 1}$$

The engine speed dependency, $g(N_{engine})$, may be semi-empirically derived (linearized).

Following the conclusion derived by from the equations above, a simple assumption would be:

$$N_{turbo} = F\left(\frac{dm_{gas}}{dt}, T_{boost} - T_{in}\right).$$

The coefficients are preferably derived by application of a least squares criterion $$\frac{\partial erf(\overline{\alpha})}{\partial \overline{\alpha}} = -2A^T(z_{turbospeed} - A\overline{\alpha}) = \overline{0}.$$

The pseudo-inverse may thereafter be applied and the coefficients $\overline{\alpha}$ are then given as $\overline{\alpha} = (A^T A)^{-1} A^T z_{turbospeed}$.

A good fit may be achieved for the function having the form $$F\left(\frac{dm_{gas}}{dt}, T_{boost} - T_{in}\right) =$$
$$F(x, y) = a_1 x^2 + a_2 xy + a_3 y^2 + a_4 x + a_5 y + a_6.$$

As is realized $$\frac{dm_{gas}}{dt}$$

will not only be gas exiting the compressor, but also exhaust gas recovery (EGR). However, if the EGR fraction, β (or equivalently, the EGR mass flow) is known the relationship may be formulated as $$F\left((1-\beta)\frac{dm_{gas}}{dt}, T_{boost} - T_{in}\right) =$$
$$F(x, y) = a_1 x^2 + a_2 xy + a_3 y^2 + a_4 x + a_5 y + a_6.$$

The controller 200 may thus include a further module configured to determine if a recovered exhaust gas flow is introduced downstream the compressor. The module 212 for determining the mass flow may thus be configured to determine the mass flow of the gas exiting the compressor and correcting the determined mass flow by a factor corresponding to recovered exhaust gas flow.

The module 210 may in some embodiments be configured to determine the temperature difference across the compressor by estimating the temperature downstream the compressor, and by subtracting the estimated temperature from a measured ambient temperature.

For the controller shown in FIG. 3, additional modules may be provided for including the impact of the pressure ratio across the compressor. Hence, $$F\left((1-\beta)\frac{dm_{gas}}{dt}, T_{boost} - T_{in}, P_{ratio}\right) =$$
$$F(x, y, z) = a_1 x^2 + a_2 xy + a_3 y^2 + a_4 x + a_5 y + a_6 z^2 + a_7 z + a_8$$

applies.

The temperature difference, $T_{boost} - T_{in}$, can be used by itself. As described above, an even better approach may be to model the temperature just after the compressor. In order to do this the impact of EGR (with a given temperature $T_{EGR}$ and a given mass flow $dm_{EGR}/dt$ should be taken into account.

The signal $T_{boost}$ can then be used to model the temperature after the charged air cooler

146 as $T_{CAC} =$ $$\left(\frac{1}{\frac{dm_{air}}{dt}}\right)\left(k_{calibration}\left(\frac{dm_{EGR}}{dt} + \frac{dm_{air}}{dt}\right) T_{boost} - T_{EGR} \frac{m_{EGR}}{dt}\right),$$

where $T_{EGR}$ and $\frac{m_{EGR}}{dt}$ is either measured or estimated in the EMS. In order to retrieve the temperature of the gas leaving the compressor, $T_{compressor}$, the temperature loss in the charger air cooler 146 could be accounted for. This may be done by using a map/function/model, f, that describes the temperature drop in the charger air cooler as $$dT_{CAC} = f\left(\frac{dm_{air}}{dt}, T_{compressor}\right).$$

In such case there may be yet another expression for $T_{CAC}$, namely $$T_{CAC} = T_{compressor} - dT_{CAC} = T_{compressor} - f\left(\frac{dm_{air}}{dt}, T_{compressor}\right).$$

As the $T_{CAC}$, is already known from the calculation after the charger air cooler, it is possible to determine a unique value $T_{compressor}$ for a given $$\frac{dm_{air}}{dt}.$$

Figure 4:
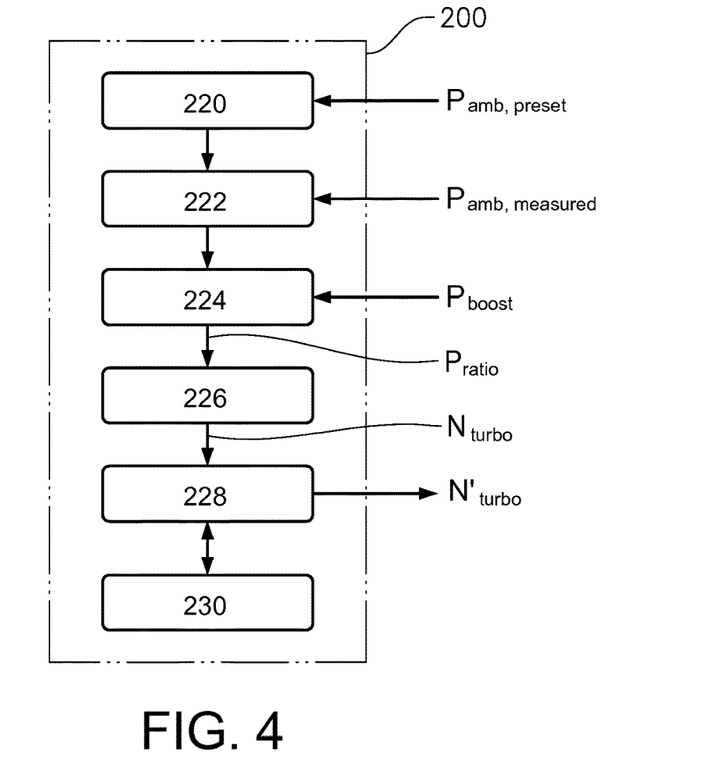
FIG. 4 is a schematic view of a controller according to an embodiment.

According to another aspect a controller 200 is provided for modeling the compressor speed. The controller 200 is shown in FIG. 4, and comprises a number of modules 220-230. A first module 220 is configured to store a reference value for the ambient pressure, corresponding to a high altitude condition. Such preset ambient pressure may e.g. be 97 kPa. A second module 222 is configured to determine if a measured ambient pressure, preferably being received by the sensor 150e of FIG. 2, is below the preset ambient pressure provided by module 220 and corresponding to high altitude conditions. If so, the third module 224 is configured to set the ambient pressure as the preset ambient pressure, and dividing the boost pressure with the ambient pressure to form a pressure ratio across the compressor 136. Hence, the pressure ratio is set according to $$p_{ratio} = \frac{p_{boost}}{\max(p_{amb,preset}, p_{amb,measured})}.$$

The fourth module 226 is configured to calculate the compressor speed value by estimating a compressor speed value using the pressure ratio as input, and a fifth module 228 is configured to calculate a corrected compressor speed value from the estimated compressor speed value and the actual ambient pressure. A sixth module 230 may be provided for communicating the modeled compressor speed communicate the modeled compressor speed to an associated unit for monitoring the current status of the turbocharger components, especially in terms of service and maintenance. The associated unit may either be arranged on-board the vehicle, or remote from the vehicle.

The real measured ambient pressure $p_{amb}$ may consequently be used in the last step, when an estimated turbo speed $N_{Turbo}$ has been modelled, according to $N^*_{Turbo} = p_{amb,measured} * N_{Turbo}$. This gives extremely good model performance which can fulfil the accuracy requirements defined by either cost aspects or engine performance (removing unnecessary torque derate at high altitudes).

This aspect may preferably be combined with the first mentioned aspect describing the use of the temperature difference with respect to FIG. 3. By such combination, an improved model for the compressor speed is achieved. However, the aspect may also be combined with other compressor speed models using the ambient pressure as input.

Now turning to FIG. 5, calibration of the model will be described. The calibration procedure may be performed straightforward as is suggested by the equations above. A proper test cycle may preferably be provided, which test cycle is used to calibrate against. Therefore, it is advantageous not to have a repetitive cycle that can shift the calibration unfavorably towards one end due to reoccurring conditions during the cycle. A way to calibrate the model is therefore to generate random test-cycles with altering engine speeds and torques according to the diagram shown in FIG. 5. Even more preferably, the test cycles should be representative for normal driving cycles. The speed/torque combination should preferably fulfill the maximum torque dependency on engine speed. The value provided by the estimator can then be used for on-board diagnosis in order to monitor the rotating parts of the turbocharger and to create an information bank containing the current 'wear' status of the said parts.

Figure 5:
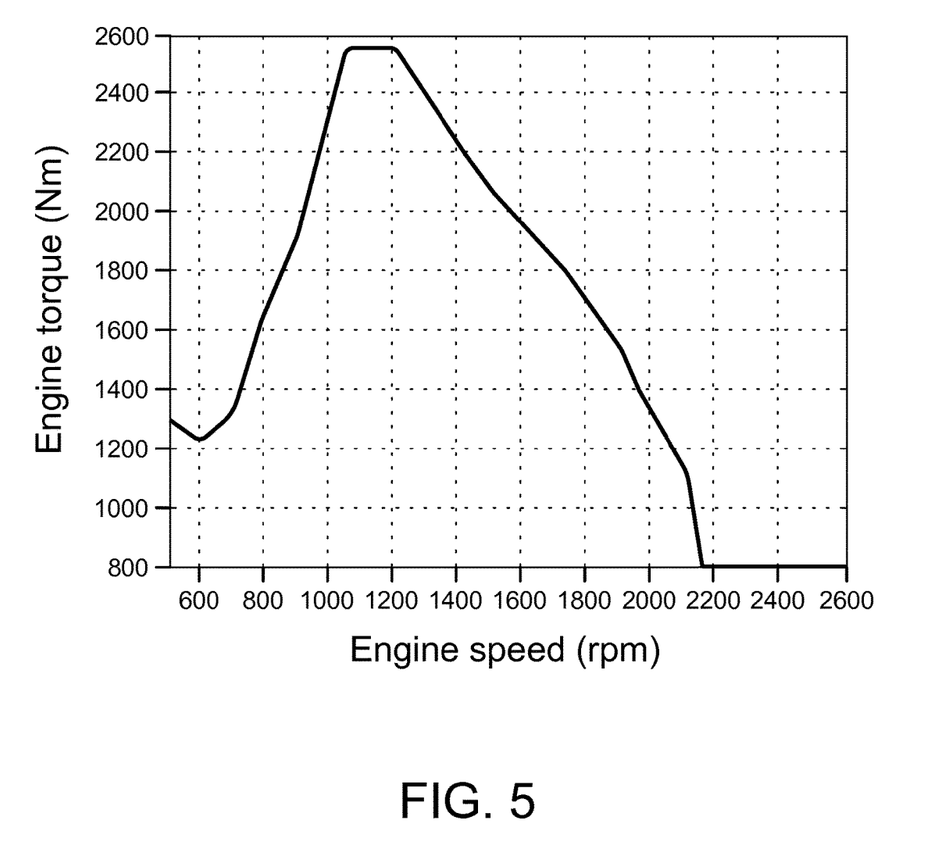
FIG. 5 is a diagram showing the engine speed as a function of engine torque for a vehicle according to an embodiment.

A suggested approach to calibrate the polynomial for the compressor speed model is given by the diagram in FIG. 5. An engine speed-torque mesh may be created where a random walk is applied between given points in order to give unbiased and extensive data for model calibration.

Figure 6:
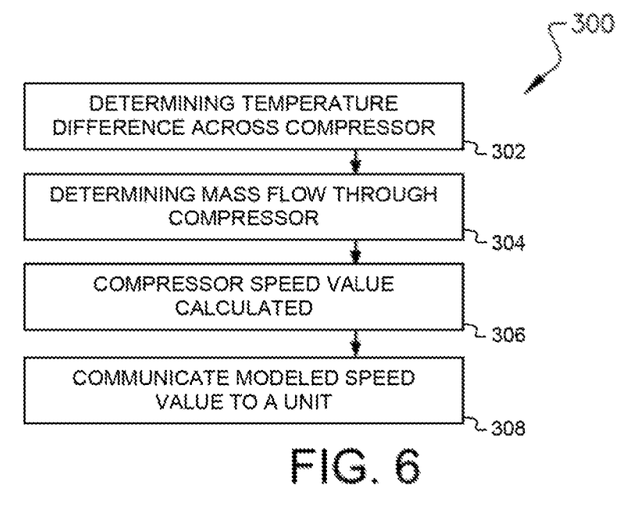
FIGS. 6 and 7 are schematic views of methods according to different embodiments.

In FIG. 6 a method 300 for modeling the speed of a compressor of a turbocharger is schematically shown. The method comprises a first step 302 of determining the temperature difference across the compressor, and a second step 304 of determining the mass flow through the compressor. A step 306 is thereafter performed in which a compressor speed value is calculated as a function of the temperature difference across the compressor and the mass flow. A final step 308 may be performed in which the modeled speed value is communicated to a unit, in line what has been previously described for the controller 200. The method may perform additional steps as has been described above.

Figure 7:
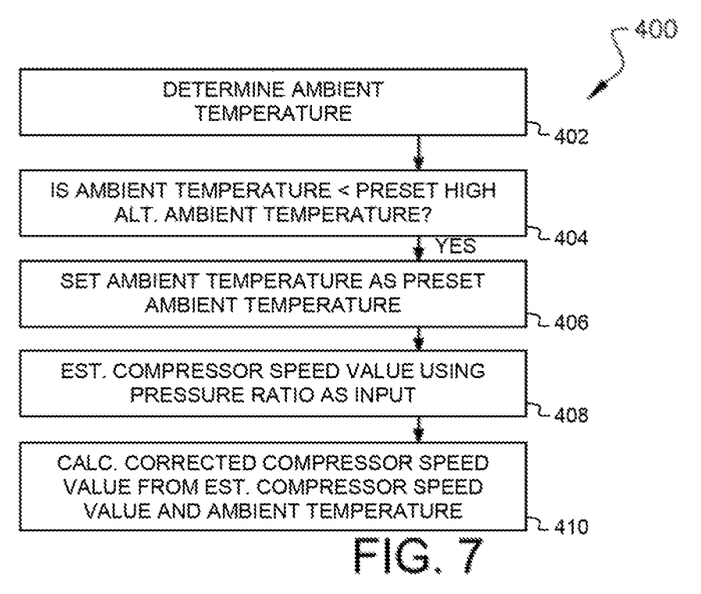

In FIG. 7 another method 400 for modeling the speed of a compressor of a turbocharger is schematically shown. The method 400 comprises a first step 402 of determining the ambient pressure, and a second step 404 of determining if the ambient pressure is below a preset ambient pressure corresponding to high altitude conditions. If so, the method 400 sets the ambient pressure as the preset ambient pressure. A third step 406 is performed for determining a pressure ratio from the boost pressure and the ambient pressure. In step 408, a compressor speed value is estimated using the pressure ratio as input, and In step 410 a corrected compressor speed value is calculated from the estimated compressor speed value and the actual ambient pressure. Additional steps may be performed, e.g. in which the modeled speed value is communicated to a unit, in line what has been previously described for the controller 200. The method may perform additional steps as has been described above.

The methods 300, 400 of FIGS. 6 and 7 may preferably be combined in order to provide an improved compressor speed model, especially in terms of simplicity and accuracy.

It is to be understood that the present invention is not limited to the embodiments described above and illustrated in the drawings; rather, the skilled person will recognize that many changes and modifications may be made within the scope of the appended claims.

The invention claimed is:

1. A method for modeling the compressor speed of a turbocharger, comprising:
    determining an ambient pressure with a pressure sensor,
    determining, with a controller, if the ambient pressure is below a preset ambient pressure corresponding to high altitude conditions, and if so, setting the ambient pressure as the preset ambient pressure,
    determining, with the controller, a pressure ratio from a boost pressure and the ambient pressure,
    estimating, with the controller, a compressor speed value using the pressure ratio as input, and
    calculating, with the controller, a corrected compressor speed value as a dependent variable from the estimated compressor speed value and the ambient pressure as independent variables used to calculate the corrected compressor speed value.

2. The method according to claim 1, comprising:
    determining a temperature difference across the compressor,
    determining a mass flow through the compressor, and
    calculating a compressor speed value as a function of the pressure ratio, the temperature difference across the compressor, and the mass flow.

3. The method according to claim 2, wherein the step of calculating the compressor speed value is performed by a polynomial representation of $$N_{turbo} = F\left(\frac{dm_{gas}}{dt}, T_{boost} - T_{in}, P_{ratio}\right) =$$

-continued $$F(x, y, z) = a_1 x^2 + a_2 xy + a_3 y^2 + a_4 x + a_5 y + a_6 z^2 + a_7 z + a_8,$$

where $N_{turbo}$ is the compressor speed, $$\frac{dm_{gas}}{dt}$$

is the mass flow, $T_{boost} - T_{in}$ is the temperature difference across the compressor, and $P_{ratio}$ is the pressure ratio across the compressor.

4. The method according to claim 3, comprising:
   determining if a recovered exhaust gas flow is introduced downstream the compressor, and wherein the step of determining the mass flow is performed by determining the mass flow of the gas exiting the compressor and correcting the determined mass flow by a factor corresponding to recovered exhaust gas flow.

5. The method according to 2, wherein the step of determining the temperature difference across the compressor is performed by estimating the temperature downstream the compressor, and by subtracting the estimated temperature from a measured ambient temperature.

6. The method according to claim 5, wherein the step of estimating the temperature downstream the compressor is performed by measuring the temperature in an air inlet manifold, and correcting this temperature by a factor corresponding to the temperature loss across an associated cooler.

7. A computer comprising a computer program for performing the steps of claim 1 when the program is run on the computer.

8. A non-transitory computer readable medium carrying a computer program for performing the steps of claim 1 when the program product is run on a computer.

9. A controller for modeling the compressor speed of a turbocharger, the controller being configured to perform the steps of the method according to claim 1.

10. A vehicle comprising the controller according to claim 9.

* * * * *